UNITED STATES PATENT OFFICE.

HARRY F. LEWIS, OF URBANA, ILLINOIS, AND HARRY D. GIBBS, OF SAN FRANCISCO, CALIFORNIA.

METHOD OF PURIFYING COMMERCIAL ANTHRAQUINONE.

1,293,610.  Specification of Letters Patent.  Patented Feb. 4, 1919.

No Drawing.  Application filed January 26, 1918. Serial No. 213,979.

(FILED UNDER THE ACT OF MARCH 3, 1883, 22 STAT. L., 625.)

*To all whom it may concern:*

Be it known that we, HARRY F. LEWIS and HARRY D. GIBBS, citizens of the United States of America, and employees of the Department of Agriculture of the said United States, residing in the city of Urbana, county of Champaign, State of Illinois; and in the city of San Francisco, county of San Francisco, State of California, respectively, (whose post-office address is Washington, D. C.,) have invented a new and useful Method of Purifying Commercial Anthraquinone.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to a process for the purification of anthraquinone.

It is well known that anthraquinone is ordinarily purified commercially by sublimation, in sublimers of various types. In this process there is a loss of an appreciable amount of anthraquinone. The object of our invention is to provide a method for the purification of anthraquinone which will be free from the objectionable features of the sublimation method for the purification of anthraquinone.

Our invention consists in the reduction of the insoluble anthraquinone to a soluble reduction compound, oxanthranol, by means of finely powdered iron in a solution of sodium or potassium hydroxid of certain concentrations and the filtration of this soluble compound; this may be easily reoxidized to anthraquinone by the action of air. In this way the anthracene and most of the other impurities commonly found in commercial anthraquinone, being soluble in the alkaline solution, are removed.

To illustrate the practical operation of our process we shall describe in detail the preferred procedure. One part of the commercial anthraquinone and two parts of fine iron powder are mixed together in a suitable vessel and are wet down with a liquid such as 50% alcohol. Thirty to fifty parts of hot 20% sodium hydroxid solution are added and the whole heated to 100° centigrade for 15 minutes. The contents of the vessel are filtered rapidly through a filter press and the residue treated with a fresh alkaline solution and heated in a similar manner. This is filtered rapidly in the filter press and the operation repeated a third time to insure the complete recovery of the anthraquinone. The combined filtrates are cooled and a stream of air passed through. This causes a reoxidation of the oxanthranol to anthraquinone of a high degree of purity. This is filtered and dried.

Having thus described our invention, we claim—

1. A process for the purification of commercial anthraquinone which process consists in subjecting anthraquinone in the solid state to the action of finely divided iron and a hot alkaline solution, and the filtration and subsequent reoxidation of the reduced anthraquinone, by which means the anthraquinone is recovered in a very pure condition.

2. A process for the purification of commercial anthraquinone which process consists in subjecting anthraquinone in the solid state to the action of two parts of finely divided iron and thirty to sixty parts of a hot solution of sodium hydroxid containing from 10 per cent. to 20 per cent. of sodium hydroxid, and the filtration and subsequent reoxidation of the reduced compound, by which means the anthraquinone is recovered in a very pure condition.

3. A process for the commercial separation of anthraquinone from small or large amounts of anthracene by treating the commercial anthraquinone in a solid state to the action of finely divided iron and a hot alkaline solution, and the filtration and subsequent reoxidation of the reduced compound, by means of which the anthraquinone is recovered in a very pure condition.

In testimony whereof, we affix our signatures in the presence of two subscribing witnesses.

HARRY F. LEWIS.
HARRY D. GIBBS.

Witnesses:
L. A. SKINNER,
H. A. LIEBS.